March 10, 1959     J. J. DOHERTY ET AL     2,877,151
METHOD OF LAMINATING VINYL FILM TO SHEET METAL
Filed July 16, 1954

INVENTORS
JAMES J. DOHERTY
CHARLES M. McCLURE
BY James J. Long

2,877,151
Patented Mar. 10, 1959

2,877,151

METHOD OF LAMINATING VINYL FILM TO SHEET METAL

James J. Doherty, Mishawaka, Ind., and Charles M. McClure, Niles, Mich., assignors to United States Rubber Company, New York, N. Y., a corporation of New Jersey Application July 16, 1954, Serial No. 443,842

1 Claim. (Cl. 154—106)

This invention pertains to a method of laminating vinyl resin to metal, and, more particularly it relates to an improved method of providing continuous lengths of flexible metal sheets or strips with a tenaciously adherent coating in the form of a vinyl film. The invention also has reference to an improved laminate of a flexible metal base and a vinyl film, in which the exposed surface of the vinyl film is provided with an embossed pattern that is comparatively permanent.

One object of the invention is to provide metal articles with a coating of vinyl film that is at once protective and decorative.

Another object is the provision of a rapid and economical method of surfacing sheet metal with a firmly adhered coating of vinyl resin.

It is also an object of the invention to apply a preformed vinyl film to flexible lengths of metal in such manner that the vinyl film adheres to the metal with sufficient strength to permit the laminate to be afterformed extensively without separation of the vinyl film from the metal base.

It is still a further object to provide an embossed vinyl-to-metal laminate in which the embossed pattern does not disappear readily from the vinyl surface when the laminate is subjected to elevated temperatures.

Figure 1:
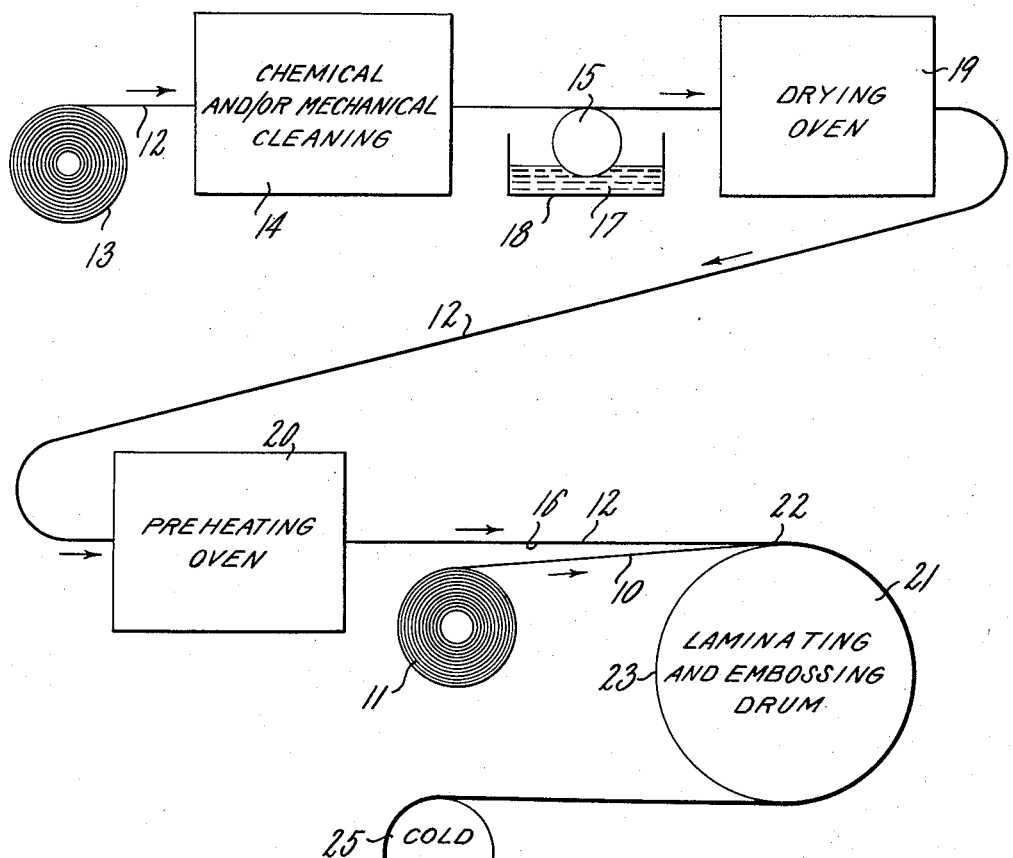
Figure 2:
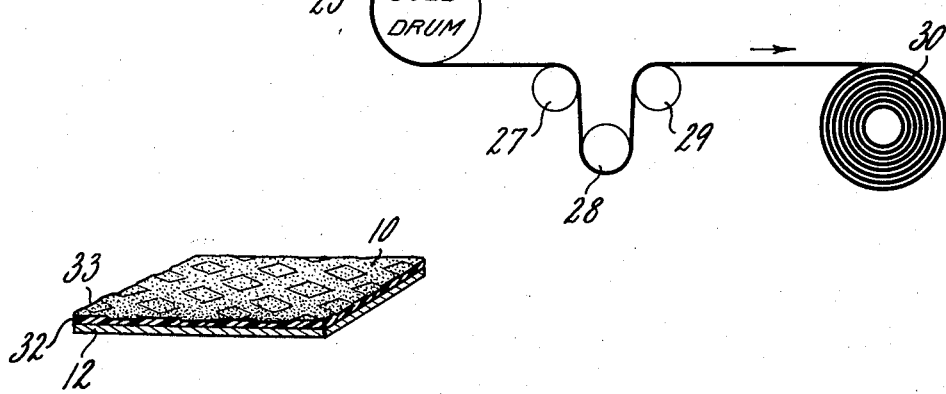

Additional objects and advantages of the invention will be made manifest in the following detailed description, which is intended to be read with reference to the accompanying drawing, wherein:

Fig. 1 is a diagrammatic representation of one method of practicing the invention; and Fig. 2 is a fragmentary perspective view of a portion of a laminate of the invention.

Referring to the drawing, and in particular to Fig. 1, the embodiment of the invention illustrated therein involves laminating a preformed vinyl film 10, contained in a rotatably supported supply roll 11, to a flexible strip 12 of metal supplied from a coil 13. The vinyl film 10 is typically polyvinyl chloride, although there may also be employed vinyl film composed of resinous copolymers of vinyl chloride with small amounts of other monomers, such as vinyl acetate and vinylidene chloride. The film 10 is plasticized vinyl resin, although for purposes of the invention it should not contain more than about 70 parts of plasticizer in 100 parts of the resin. In all cases the film 10 will contain at least 5 parts of plasticizer, and it may be stated that the preferred range is within from about 15 to 45 parts of plasticizer. The vinyl film is typically made by calendering the resin at an elevated temperature somewhat in excess of its softening temperature, usually within the range of from about 300° to 400° F. Although the vinyl film does not have a definite softening point, but softens gradually over rather a broad range, the term softening point as used in the present connection has reference to the temperature at which the film ceases to be self supporting and becomes distorted readily of its own weight. A specific example of a suitable vinyl film has the following composition:

| | Parts |
|---|---|
| Polyvinyl chloride | 100 |
| Dioctyl phthalate | 30 |

This film has a softening temperature of about 375° F. and is calendered at about 380° F.

The metal strip 12 is usually composed of steel or other ferrous metal, or of a light metal such as aluminum or magnesium, or alloys thereof. The metal strip is advanced under tension through a cleaning zone 14 in which the strip is subjected to chemical and/or mechanical cleaning to remove all dirt, grease, oxide, scale, etc. according to the conventional cleaning procedures employed for preparing the particular metal in question for receiving a surface coating. The surface may be subjected to an adhesion-promoting treatment, such as that known as bonderizing. After leaving the cleaning zone, the cleaned metal strip contacts an applicator roller 15 which serves to apply a thin film 16 of a thermoplastic adhesive preparation 17 contained in a supply trough 18 in which the applicator roller is mounted. The strip must be maintained under considerable tension to make certain that it will be held perfectly straight during this operation, and thereby receive a uniform and complete thin coating of the thermoplastic adhesive. The adhesive preparation is typically composed of a solution in a volatile organic solvent of a thermoplastic adhesive capable of effecting a good bond between the vinyl resin and the metal. Thermoplastic vinyl-to-metal adhesives of various kinds are available commercially, and are based frequently on vinyl resins modified by small amounts of highly polar materials, especially those of acid reaction. Copolymers of vinyl chloride with 10–20% of vinyl acetate and 0.5–10% of a carboxylic acid, especially an alpha, beta-olefinically unsaturated carboxylic acid, such as maleic acid (or its anhydride) form particularly effective vinyl-to-metal thermoplastic adhesives for use in the invention. Good results are obtainable with the commercial adhesive known as Kotol #330, made by the Angier Products Company.

The thermoplastic adhesive coated metal strip then passes into a drying zone 19, in which the volatile organic solvent is evaporated from the thermoplastic adhesive coating, with the aid of heat, leaving the thermoplastic adhesive in the form of a continuous solid film on the surface of the metal. The thickness of the dried film of thermoplastic adhesive is suitably of the order of 0.1 mil to 2 mils.

In the next stage of the process the thermoplastic adhesive coated metal strip is drawn into a preheating zone 20, in which the temperature of the metal is raised to a point exceeding by some 1° to 100° F., and preferably by 5° to 25° F., the softening temperature of the vinyl film to be applied. With the specific film exemplified above, containing 30 parts of plasticizer, having a softening point of about 375° F., good results are obtained by preheating the thermoplastic adhesive coated metal strip to about 380° F. Infra-red lamps or other radiant heating means (not shown) are suitably employed to preheat the metal sheet in the zone 20. The preheating also removes the last traces of solvent from the thermoplastic adhesive film, and in the preheated condition the adhesive film is dry and non-tacky, although it is soft and plastic since the thermoplastic adhesive is above its normal softening temperature, but it is not in an actual fluid condition. The thus preheated thermoplastic adhesive coated metal strip, and the cold vinyl film (i. e., the unheated vinyl film at room temperature) are then simultaneously advanced into contact with a laminating drum 21 of relatively large diameter that is so supported as to be freely rotatable. The arrangement is such that the unheated vinyl film passes between the metal strip and the surface of the drum at essentially the same point 22 at which the metal strip is tangent to the drum. The laminating drum is maintained at a temperature that is considerably below the temperature of the preheated metal strip, and the temperature of the laminating drum is also considerably below the softening temperature of the vinyl film. Using the typical vinyl film specified, the surface temperature of the laminating drum is maintained at about 150° F. In general, the temperature of the laminating drum will be from about 100° to 300° F. lower than the temperature of the preheated metal strip, and proportionately below the softening temperature of the vinyl film. It will be understood that the laminating drum will be provided with conventional internal cooling means (not shown).

The laminating drum is provided with a surface 23 corresponding to the type of surface desired on the vinyl film. The surface 23 may be provided with any textural relief design desired. The vinyl film and the preheated metal strip pass around the laminating drum for a considerable portion of the periphery thereof, usually to the extent of an arc of 90° to 180° or more, and during this period the strip is continued to be maintained under appreciable tension as it advances, with the result that the vinyl film is firmly pressed by the tensioned metal sheet into contact with the surface of the laminating drum. The freely rotatable laminating drum thus rotates at a peripheral speed equal to the linear rate of advancement of the metal strip and vinyl film. The speed of advancement of the metal strip and vinyl film, and the length of the arc for which the strip and film are in contact with the drum, as well as the relative temperatures of the drum and preheated strip, are such that the temperature of the strip, upon leaving the drum, is considerably below the softening temperature of the film, as well as below the temperature to which the metal strip was preheated. It will be understood that such cooling or lowering of the temperature of the metal strip is a consequence in part of the heat lost by the strip to the ambient atmosphere, and in part due to heat transferred to the laminating drum, which is at a relatively lower temperature than the preheated strip. With the particular vinyl film illustrated, having a softening point of about 375° F., and with the metal strip preheated to a temperature of about 380° F., and the laminating drum heated to a temperature of 150° F., the temperature of the vinyl resin-metal laminate on leaving the laminating drum, after being in contact with the drum for about 13 seconds, was about 180° F.

Considering in more detail the precise sequence of temperature relations existing in the materials being laminated as they traverse the laminating drum, it will be noted that the vinyl film is initially cold (i. e., at room temperature) at the instant that it contacts on its reverse side the hot preheated metal strip and on its front side the relatively cooler surface of the laminating drum. Specifically, the reverse side of the film is exposed to a temperature considerably higher than its softening point, while the front side of the film is exposed to a temperature considerably below its softening point. The reverse side of the vinyl film, as a result of the heat transmitted to it by the preheated strip, quickly attains a temperature in excess of its softening temperature, and more particularly it attains a temperature at which it is susceptible of being heat welded to the thermoplastic adhesive, which has also been heated to a temperature above its softening point, and in fact has been heated to its heat-welding temperature by the preheated metal strip. Under such temperature conditions, and under the influence of the considerable pressure exerted against the drum by the tensioned metal strip, the vinyl film becomes inseparably united to the thermoplastic adhesive coating. Meanwhile, the front surface of the vinyl film (i. e., the surface of the film which is in contact with the relatively cooler surface of the laminating drum) does not become heated to a temperature exceeding the softening point of the vinyl film, but merely assumes a temperature in the neighborhood of the surface temperature of the laminating drum. The conditions existing here are such that the surface of the vinyl film becomes soft enough to take readily and faithfully the exact surface characteristic of the laminating drum, and if the laminating drum bears a textured surface or relief design, the front surface of the vinyl film thereby becomes embossed in a desired pattern, but at the same time the front surface of the film is not in such a soft condition as to be easily injured by such embossing operation.

Immediately after leaving the laminating drum, the metal strip, now bearing the filmly adhered vinyl resin film, passes over a cooling roller 25 which serves to return the assembly essentially to room temperature. The laminate then passes around an arrangement of rollers 27, 28 and 29 so disposed as to maintain the required positive tensioned advance of the strip through the apparatus, and thereafter the laminate is wound up into a roll 30.

The vinyl-to-metal laminate made in accordance with the foregoing procedure possesses a number of unique characteristics. Because of the thermoplastic nature of the adhesive employed, and because of the particular temperature conditions under which the vinyl film is brought into pressurized contact with the prepared and pre-heated metal surface, the vinyl film becomes most firmly heat sealed to the adhesive layer, with the result that the laminate can be after-formed radically without injury to the adhesive bond. Thus, the laminate prepared as described can be bent sharply through a 180° angle, it can be drawn deeply into various desired shapes, and, in fact, virtually all of the various forming operations usually performed on sheet metal can be carried out without separation of the vinyl film from the metal base. The present laminates therefore suggest themselves for use in fabricating numerous articles usually made from sheet metal, such as containers; structural metals, partitions, moldings and trim; automobile and truck interior and exterior parts; outdoor signs, awnings, etc.; furniture, cabinets, counters and the like; as well as various applications in which sheet metal itself has heretofore generally been considered rather unsuitable, such as in making luggage.

The method described is particularly advantageous from the standpoint of avoiding injury to the vinyl film by introducing the film in the cold into the laminating zone where the necessary welding heat is supplied by the preheated sheet metal at the interface of the vinyl film and the thermoplastic adhesive, while the remaining thickness of the vinyl film is not subjected to unnecessarily high temperatures which would be sufficient to soften the whole film unduly and thereby occasion injury to the film. In this connection it will be noted that the laminating roll itself is maintained relatively cool, compared to the temperature necessary to effect heat-welding or heat-sealing at the thermoplastic adhesive vinyl film interface. This greatly reduces the possibility of injury to the film while at the same time insuring a good bond with the thermoplastic adhesive.

The manner in which pressure is applied during the laminating is also conductive to firm and uniform bonding or welding without danger of injury to the film. Thus, by introducing the vinyl film between the laminating drum and the sheet metal at the point at which the sheet metal becomes tangent with the laminating drum, the film is brought smoothly and uniformly into pressurized contact with the sheet metal and with the laminating drum without disrupting the vinyl film or causing piling up of the vinyl resin at the point where the film enters the pressure zone. The utilization of tension on the metal sheet to effect pressurized contact with the vinyl film while the film is supported on an extended arc of the surface of the laminating drum insures the uniform application of pressure over an appreciable period of travel and provides ample opportunity for the desired heat-sealing to take place between the vinyl film and the thermoplastic adhesive.

The desired laminating process can be carried out economically and efficiently, because the sheet metal may be drawn through the laminating apparatus quite rapidly, since only a relatively few seconds contact under the described conditions of temperature and pressure is necessary to effect the permanent union of the thermoplastic adhesive and the vinyl film. Thus, for example, when using a laminating drum some two feet in diameter, there is no difficulty about passing the metal strip through the apparatus at a speed of some thirty feet per minute.

Because the thermoplastic adhesive employed is devoid of curing or polymerizing materials and effects the desired bond without any necessity for cure or polymerization during the lamination, the process is unusually rapid. The time interval of pressurized contact used in the process is very small compared with that which would be required if the adhesive had to be cured or polymerized in conjunction with formation of the bond. In general, pressurized contact times within the range of from 3 to 15 seconds are adequate. It will be apparent that if development of the adhesive bond depended upon cure or polymerization, such rapid lamination could not be effected.

Only moderate pressures are necessary in the process, since the welding or sealing of the vinyl film to the adhesive takes place readily under the temperature conditions specified. Heat welding of the thermoplastic adhesive to the vinyl film is facilitated by employment of an adhesive having a softening point that is not greater than the softening temperature of the vinyl film, so that when the metal strip is preheated to a temperature in excess of the softening temperature of the vinyl film, the adhesive will also be above its softening temperature.

One of the most remarkable features of the present method lies in the ability to provide various desired surface conditions on the vinyl film. Thus, various surface grains or embossed designs may be imparted with good definition, which is retained much more permanently and faithfully than one would ordinarily predict from the known properties of the vinyl film, under the laminating conditions described. It is desired to point out that the previously known methods of embossing vinyl film have involved the application of elevated temperatures of the same order as the softening temperature of the film to the surface that is being embossed. This was considered necessary in order that the embossing would be retained permanently, that is, in order that the surface of the vinyl film would lose its original "elastic memory" of its smooth surface and take on the new shape or impression imparted by the embossing roller surface, without any tendency to return to the shape or surface condition existing prior to the embossing operation. The surface being embossed was heated at least to its softening temperature to permit the vinyl surface to flow into its new shape while in a condition sufficiently soft and plastic (i. e., sufficiently close to a fluid condition) to permit the stresses occasioned by the embossing to decay substantially, so that the surface of the film in effect acquired a permanent set in the embossed form. If the temperature of the embossed surface were not sufficiently high, the embossing would "take" temporarily but would lose definition if the embossed surface is subjected to even relatively moderately elevated temperatures. The action of residual elastic memory stresses in the surface of the film embossed at an insufficiently high temperature tended to return the surface to the shape it had prior to the embossing.

In contrast to this, the present method does not involve heating the surface being embossed to the softening temperature of the vinyl film. Instead, the high-temperature side of the film is the rear surface, that is, the surface in contact with the thermoplastic adhesive on the preheated metal sheet. The front side of the vinyl film, on which the embossing is impressed, is in contact with the relatively cooler laminating drum, and therefore such surface does not become unduly heated. As a result of the temperature conditions described, only the rear surface of the film, and the immediately adjacent portions thereof, are heated to the softening temperature, in order to effect heat-welding to the thermoplastic adhesive. The front surface of the film and a definite thickness immediately adjacent thereto, remain well below the softening temperature of the vinyl film, with the result that the film as a whole remains essentially self-supporting throughout the laminating and embossing operation. As a consequence of the relatively low temperature condition of the front layer of the film, the embossing proceeds without danger of tearing or distortion of the film, and therefore a good embossed layer free from defects is obtained.

The unexpected permanence of the embossing on the present laminate, in spite of the fact that the surface was not embossed at its softening temperature, is associated with the fact that the sub-stratum 32 (Fig. 2) of the film, that is, the thickness of the film to the rear of the embossed front surface layer 33, was subjected during the embossing to a temperature exceeding the softening temperature of the film, so as to acquire at the time the embossing is impressed a new elastic memory, which apparently serves to maintain the embossed surface in its newly impressed condition, even though such surface was not in itself heated to a temperature sufficient to permit the surface to acquire its own new elastic memory. The fact that the embossed film is firmly united to the metal backing at the time of the embossing operation may also be significant with respect to the unusual permanence of the embossing. Whatever the explanation, it is a surprising observed fact that the temperature conditions described in connection with the laminating and embossing result in more permanent embossing than could be obtained ordinarily with the relatively low embossed surface temperature utilized.

The unusual ability of the embossed surface of the present laminate to retain definition is observed especially at moderately elevated temperatures. Ordinarily, if an embossed vinyl film surface is not subjected to a sufficiently high temperature during the embossing, the definition of the embossed design is soon lost when the film is heated moderately. Such loss of definition at exposure to elevated temperatures is occasioned by the residual "elastic memory" stresses present in the embossed layer, which tend to return the surface to the shape that it had before the embossing. As the film is warmed, these residual stresses are enabled to act more readily because the film becomes soft and more plastic. The present embossing retains good definition even when heated to moderately elevated temperatures, such as 300° F., which would be sufficient to impair the definition of an embossed vinyl surface that was not embossed at a sufficiently high temperature.

Having thus described our invention, what we claim and desire to protect by Letters Patent is:

A continuous process for producing a sheet metal product coated with an embossed film of vinyl resin that can be subjected to severe after-forming without separation of the vinyl film, and that can be subjected to moderately elevated temperatures without loss of the embossed pattern, comprising providing a vinyl film containing 15 to 45 parts of plasticizer per 100 parts of vinyl resin, continuously advancing under tension a running length of the said sheet metal, applying a thin uniform coating of a thermoplastic adhesive to the surface of such sheet metal, heating the thermoplastic adhesive-coated metal sheet to a temperature in excess of the softening temperature of the thermoplastic adhesive and from 5° to 25° F. greater than the softening temperature of the said vinyl film, bringing the preformed vinyl film into contact with the surface of the preheated metal sheet bearing the said thermoplastic adhesive, and passing the thus assembled metal sheet and vinyl film around the surface of a large diameter laminating and embossing drum for an arc of 90° to 180° to provide pressurized contact for a time of 3 to 15 seconds with the metal sheet disposed on the outside and the vinyl film confined between the surface of the laminating and embossing drum and the thermoplastic adhesive-coated surface of the metal sheet, while maintaining the advancing metal sheet under tension to press said thermoplastic adhesive-coated surface firmly against the surface of the vinyl film, the said laminating and embossing drum being maintained at a temperature from 100° to 300° F. below the softening temperature of the vinyl film, whereby the vinyl film becomes substantially permanently embossed and firmly united to the thermoplastic adhesive-coated surface of the metal sheet without injury to the vinyl film, and thereafter cooling the resulting laminate to room temperature.

References Cited in the file of this patent

UNITED STATES PATENTS

| | | |
|---|---|---|
| 2,070,600 | Jenett | Feb. 16, 1937 |
| 2,113,128 | Cunnington | Apr. 5, 1938 |
| 2,387,631 | Weir | Oct. 23, 1945 |
| 2,403,077 | Hershberger | July 2, 1946 |
| 2,514,185 | Eberly | July 4, 1950 |
| 2,551,591 | Foord | May 8, 1951 |
| 2,632,921 | Kreidl | Mar. 31, 1953 |
| 2,700,630 | Bukey et al. | Jan. 25, 1955 |
| 2,719,564 | Schneider | Oct. 4, 1955 |
| 2,722,495 | Hedges | Nov. 1, 1955 |
| 2,728,703 | Kiernan et al. | Dec. 27, 1955 |